United States Patent
Hondo et al.

(10) Patent No.: US 8,884,579 B2
(45) Date of Patent: Nov. 11, 2014

(54) STORAGE BATTERY MANAGEMENT SYSTEM

(75) Inventors: Yoshiyuki Hondo, Kawasaki (JP); Minoru Yonezawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 909 days.

(21) Appl. No.: 13/050,590

(22) Filed: Mar. 17, 2011

(65) Prior Publication Data

US 2012/0074909 A1     Mar. 29, 2012

(30) Foreign Application Priority Data

Sep. 28, 2010    (JP) ................................. 2010-217644

(51) Int. Cl.

| | |
|---|---|
| H02J 7/00 | (2006.01) |
| H01M 10/44 | (2006.01) |
| H01M 10/46 | (2006.01) |
| H02J 7/04 | (2006.01) |
| H02J 13/00 | (2006.01) |
| H02J 3/32 | (2006.01) |

(52) U.S. Cl.
CPC ............... *H02J 7/002* (2013.01); *H02J 7/042* (2013.01); *H02J 13/0024* (2013.01); *H02J 7/0057* (2013.01); *Y04S 10/14* (2013.01); *Y02E 60/722* (2013.01); *H02J 3/32* (2013.01)
USPC ........................................................ 320/101

(58) Field of Classification Search
USPC ........................................................ 320/101
See application file for complete search history.

(56) References Cited

U.S. PATENT DOCUMENTS 8,063,605 B2 * 11/2011 Tonegawa et al. ............. 320/107
2008/0224541 A1   9/2008 Fukuhara

FOREIGN PATENT DOCUMENTS

| JP | 2000-228832 A | 8/2000 |
| JP | 2001-157383 | 6/2001 |
| JP | 2004-120855 | 4/2004 |
| JP | 2007-185083 A | 7/2007 |
| JP | 2008-67418 | 3/2008 |

OTHER PUBLICATIONS

Office Action issued Aug. 24, 2012 in Japanese Patent Application No. 2010-217644 with English language translation.

* cited by examiner

*Primary Examiner* — Samuel Berhanu
(74) *Attorney, Agent, or Firm* — Oblon, Spivak, McClelland, Maier & Neustadt, L.L.P.

(57) ABSTRACT

A power receiving unit receives power generated by power generating units via a power system. A power information acquiring unit acquires first system power information showing the proportion of power generated by each power generating unit in a first period. An intensity database stores environmental loading intensities for each power generating unit. A charge load intensity calculator calculates a charge load intensity which is a weighted sum of the environmental loading intensity corresponding to each power generating unit based on the proportion of each power generating unit in the first system power information. A charge/discharge judging unit determines to charge a storage unit in a first period when the charge load intensity is less than a reference value, and not to charge the storage unit in the other cases. A charge/discharge controller charges the storage unit in the first period when determined to charge the storage unit.

5 Claims, 17 Drawing Sheets

POWER-GENERATION-METHOD-BASED INTENSITY DATABASE

| POWER GENERATION METHOD | CO2 | NOx | SOx | ... |
|---|---|---|---|---|
| COAL-FIRED THERMAL POWER GENERATION | 0.975kgCO2/kWh | ... | ... | |
| OIL-FIRED THERMAL POWER | 0.742kgCO2/kWh | ... | ... | |
| LNG THERMAL POWER | 0.608kgCO2/kWh | ... | ... | |
| SOLAR POWER | 0.053kgCO2/kWh | ... | ... | |
| WIND POWER | 0.029kgCO2/kWh | ... | ... | |
| NUCLEAR POWER | 0.022kgCO2/kWh | ... | ... | |
| DOMESTIC SOLAR POWER | 0.060kgCO2/kWh | ... | ... | |
| ... | ... | ... | ... | |

SYSTEM'S POWER INFORMATION

| TIME | 11:45-12:00 |
|---|---|
| POWER GENERATING UNIT | PROPORTION |
| COAL-FIRED THERMAL POWER | 30% |
| OIL-FIRED THERMAL POWER | 20% |
| NUCLEAR POWER | 30% |
| HYDRAULIC POWER | 0% |
| WIND POWER | 0% |
| SOLAR POWER | 20% |
| ... | |
| POWER CONSUMPTION | 0.075kwh |

FIG. 2

CUSTOMER'S POWER GENERATING INFORMATION

| CUSTOMER'S POWER GENERATING FACILITY | |
|---|---|
| POWER GENERATION | 0.050kwh |
| POWER GENERATING UNIT | PROPORTION |
| SOLAR POWER | 100% |
| FUEL BATTERY | 0% |
| ... | 0% |

FIG. 3

POWER-GENERATION-METHOD-BASED INTENSITY DATABASE

| POWER GENERATION METHOD | $CO_2$ | $NO_x$ | $SO_x$ | ... |
|---|---|---|---|---|
| COAL-FIRED THERMAL POWER GENERATION | $0.975 kgCO_2/kWh$ | ... | ... | |
| OIL-FIRED THERMAL POWER | $0.742 kgCO_2/kWh$ | ... | ... | |
| LNG THERMAL POWER | $0.608 kgCO_2/kWh$ | ... | ... | |
| SOLAR POWER | $0.053 kgCO_2/kWh$ | ... | ... | |
| WIND POWER | $0.029 kgCO_2/kWh$ | ... | ... | |
| NUCLEAR POWER | $0.022 kgCO_2/kWh$ | ... | ... | |
| DOMESTIC SOLAR POWER | $0.060 kgCO_2/kWh$ | ... | ... | |
| ... | | | | |

FIG. 4

CHARGE/DISCHARGE HISTORY DATABASE

| TIME | NUMBER OF CHARGE | NUMBER OF DISCHARGE | NUMBER OF NATURAL DISCHARGE | CHARGE PROBABILITY Pc(t) | DISCHARGE PROBABILITY Pdis(t) | NATURAL DISCHARGE PROBABILITY Pn(t) |
|---|---|---|---|---|---|---|
| ... | | | | ... | ... | ... |
| 10:45-11:00 | 274 | 37 | 55 | 0.75 | 0.1 | 0.15 |
| 11:00-11:15 | 274 | 18 | 73 | 0.75 | 0.05 | 0.2 |
| 11:15-11:30 | 37 | 183 | 146 | 0.1 | 0.5 | 0.4 |
| 11:30-11:45 | 37 | 0 | 329 | 0.1 | 0 | 0.9 |
| 11:45-12:00 | 37 | 0 | 329 | 0.1 | 0 | 0.9 |
| ... | | | | ... | ... | ... |

FIG. 5

| TIME PERIOD | Mc_max | Md_max |
|---|---|---|
| T1 | 3 | 1 |
| T2 | 2 | 2 |
| T3 | 1 | 3 |
| ... | ... | ... |

FIG. 18

STORAGE BATTERY MANAGEMENT SYSTEM

CROSS REFERENCE TO RELATED APPLICATIONS

This application is based upon and claims the benefit of priority from the prior Japanese Patent Application No. 2010-217644, filed on Sep. 28, 2010, the entire contents of which are incorporated herein by reference.

FIELD

The embodiments of the present invention relate to a storage battery management system for discharging and charging a storage unit such as a storage battery.

BACKGROUND

The concept of smart grid, which is a highly intellectual power network, has been spreading. Correspondingly, various dispersed power sources are actively employed when generating power by using renewable energy such as solar power, wind power, and hydraulic power, and storage batteries are used as buffers to stabilize the power. It is considered that the relation between the power supply/demand system and customers will be more complicated.

As a conventional charge management method, there is known a method for keeping electric cost low by managing the storage battery so that the storage battery is preferably charged in the time period such as the nighttime etc. (recommended feeding time) when power cost is inexpensive. Further, in a lithium-ion storage battery currently used widely as a storage battery, it is generally said that its capacity performance deteriorates when the battery is kept in a full charge state, and that its lifetime is shortened when the battery is recharged after being completely discharged compared to the case of normal use. Therefore, the lithium-ion storage battery is required to be in a charge state between 20% and 80% to restrain the deterioration in its capacity performance.

The conventional technique intends to optimize charge/discharge only in terms of power cost, considering economic efficiency when storing power in a storage battery. In the conventional technique, environmental load when charging the storage battery and deterioration in the storage battery are not considered.

BRIEF DESCRIPTION OF THE DRAWINGS

FIG. 2 is a diagram showing an example of system power information.

FIG. 3 is a diagram showing an example of customer power generation information.

FIG. 4 is a diagram showing an example of a power-generation-method-based intensity database.

FIG. 5 is a diagram showing an example of a charge/discharge history database.

FIG. 18 is a diagram showing an example of how to set a maximum charge number and a maximum discharge number in each time period.

DETAILED DESCRIPTION

Figure 1:
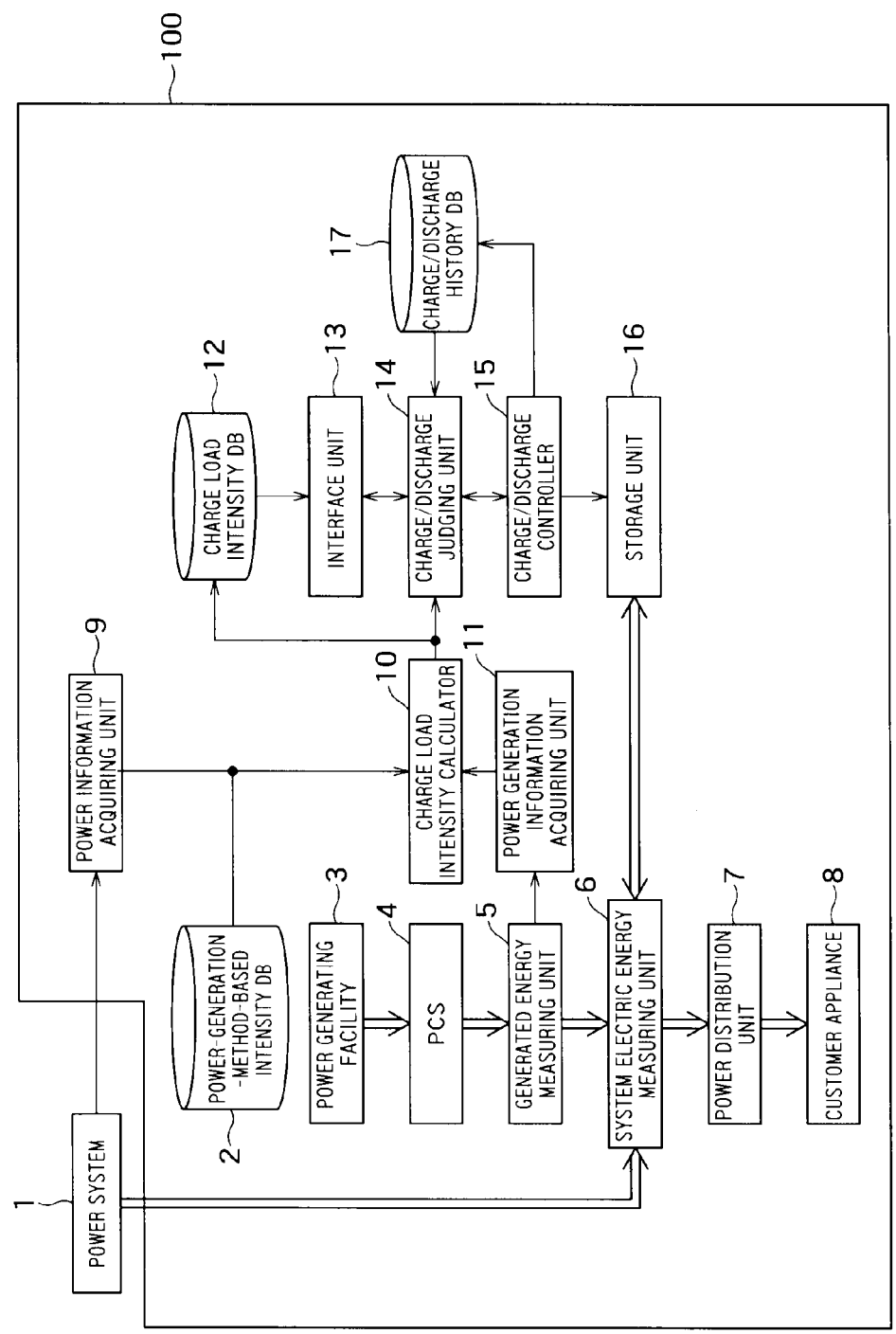
FIG. 1 is a block diagram of a storage battery management system according to a first embodiment of the present invention.

According to an aspect of the embodiments, there is provided a storage battery management system.

The management system includes the power receiving unit, a power information acquiring unit, an intensity database, a charge load intensity calculator, a storage unit, a charge/discharge judging unit, and a charge/discharge controller.

The power receiving unit receives power generated by a plurality of power generating units via a power system.

The power information acquiring unit acquires first system power information showing a proportion of power generated by each power generating unit in a first period.

The intensity database stores environmental loading intensities indicating each an amount of environmental load emitted by each power generating unit per unit electric energy.

The charge load intensity calculator calculates a charge load intensity which is a weighted sum of the environmental loading intensities corresponding to each power generating unit by the proportion of each power generating unit shown in the first system power information.

The storage unit is capable of charging/discharging power.

The charge/discharge judging unit determines to charge the storage unit in the first period when the charge load intensity is less than a reference value, and to determine not to charge the storage unit in the first period when the charge load intensity is equal to or greater than the reference value.

The charge/discharge controller charges the storage unit in the first period by using the power received by the power receiving unit, when the charge/discharge judging unit determines to charge the storage unit.

Hereinafter, the embodiments of the present invention will be explained referring to the drawings.

(First Embodiment)

FIG. 1 is a block diagram of a storage battery management system according to a first embodiment of the present invention.

This system 100 is provided in a customer's building (home) consuming power, for example.

The system 100 is connected to a power system 1 through a power line and an information line (control line). In FIG. 1, respective blocks are connected through the power line represented by a double line and the information line represented by a solid line.

The power system 1 generates power by a plurality of power generating units using nuclear power, hydraulic power, thermal power, wind power, solar power, geothermal power, etc. The power system 1 can supply the generated power to the system 100 through the power line.

Further, the power system 1 transmits system power information to the system 100 at regular intervals. The regular interval is a minimum time unit for updating the system power information. In the present embodiment, the power information is updated once every 15 minutes. Note that this is only an example, and thus the power information may be updated at shorter intervals or longer intervals. The power system 1 may transmit the system power information depending on a request from the system 100.

Here, the system power information includes: a proportion of power generation of each power generating unit to the total power generated by the power system 1; and electric energy which can be supplied to the customer. The information about the proportion of power generation of each power generating unit is referred to as first system power information, and the information about the available electric energy supply is referred to as second system power information.

FIG. 2 shows an example of the system power information. FIG. 2 shows the proportion of power generation of each power generating unit during 15 minutes from 11:45 to 12:00, and electric energy (power consumption) which can be supplied to the customer during this period of time.

A power information acquiring unit 9 in the system 100 acquires the system power information from the power system 1. The information is acquired in a period t (at the start of the period t, for example) preceding a scheduled charge/discharge period t+1. The scheduled charge/discharge period is a period (first period) in which charge/discharge is scheduled. In this example, the length unit of the scheduled charge/discharge period is 15 minutes similarly to the interval for updating the system power information. In this example, acquired system power information includes information concerning the period t+1 (proportion of power generation and available electric energy supply). The acquired system power information is transmitted to a charge load intensity calculator 10.

A power generating facility 3 is a power generating unit for generating electric power by using solar power, wind power, etc. The power generated by the power generating facility 3 undergoes DC-AC conversion performed by a PCS (power conditioner) 4.

A generated energy measuring unit 5 measures the converted power with respect to each power generating unit, and generates power generation information including total power generation and proportion of power generation of each power generating unit. Note that the power generation information may include power generation of each power generating unit. The generated energy measuring unit 5 generates the power generation information at regular intervals. The power generation information is transmitted to a power generation information acquiring unit 11. Further, the generated energy measuring unit 5 receives from the PCS 4 the power of each power generating unit, mixes the power, and transmits the mixed power to a system electric energy measuring unit (power receiving unit) 6.

The power generation information acquiring unit 11 acquires the power generation information from the generated energy measuring unit 5, and stores the information in an internal storage (not shown). The power generation information acquiring unit 11 predicts, based on the power generation information in the storage, power generation of the power generating facility 3 and proportion of power generation of each power generating unit in the scheduled charge/discharge period t+1, and generates customer power generation information including predicted values. The generated customer power generation information is transmitted to the charge load intensity calculator 10. FIG. 3 shows an example of the customer power generation information. Power generation can be predicted by arbitrarily using a well-known prediction method for predicting a future value from previous data.

For example, prediction can be achieved by using regression analysis. As an example of linear regression, explanatory variables Xh−1, Xh−2, Xh−3 . . . showing power generation in a plurality of periods h−1, h−2, h−3 . . . and regression coefficients A−1, A−2, A−3, . . . are used to define a regression model showing that Y=A−1*Xh−1+A−2*Xh−2+A−3*Xh−3+ . . . +D. D is a constant term. The regression coefficients A−1, A−2, A−3, . . . and constant term D are obtained based on a least-square method etc. using previous power generation information. Power generation in periods t−1, t−2, t−3 . . . are given to Xh−1, Xh−2, Xh−3 . . . of the regression model obtained as stated above, by which power generation in the period t+1 (first period) can be predicted. This process is performed with respect to each power generating unit. The proportion of power generation of each power generating unit can be obtained by calculating the proportion of power generation of each power generating unit to the total of the predicted power generation of respective power generating units. Note that when only one power generating unit is provided, the proportion of power generation is set 100% unconditionally.

Further, as another method, prediction can be achieved by using a classifier such as a decision tree. In this case, power generation is discretized first, and a classifier for obtaining power generation in a period h+1 is created from power generation in a plurality of periods h−1, h−2, h−3, . . . . Then, power generation in a plurality of periods t−1, t−2, t−3 . . . are given to this classifier, by which power generation in the period t+1 (first period) can be predicted. This process is performed with respect to each power generating unit. As the width of discretization becomes smaller, the prediction can be performed with higher granularity. The proportion of power generation of each power generating unit can be obtained by calculating the proportion of power generation of each power generating unit to the total of the predicted power generation of respective power generating units. Note that the method for creating such a classifier is well known, and thus further explanation will be omitted.

As a simple method, the power generation and proportion of power generation in the period t−1 can be used directly as the values in the period t+1. This method can be used when the scheduled period has a short time length.

A storage unit 16 is a storage battery capable of charging/discharging power, such as lead storage battery, NAS storage battery, lithium-ion storage battery, etc. The storage unit 16 may be an assembled battery formed of a plurality of storage batteries. The storage unit 16 can discharge the power stored therein in order to supply the power to a power distribution unit 7 through a system electric energy measuring unit 6. Further, the storage unit 16 can receive the power generated by the power generating facility 3 and the power system 1 through the system electric energy measuring unit 6 in order to store the power therein.

The system electric energy measuring unit (power receiving unit) 6 supplies the power received from the power system 1 and the power generating facility 3 to the power distribution unit 7. The power distribution unit 7 transmits the supplied power to a customer's power-consuming appliance (customer appliance) 8. Further, when charging the storage unit 16, the system electric energy measuring unit 6 transmits the power from the power system 1 or the power generating facility 3 to the storage unit 16. Furthermore, the system electric energy measuring unit 6 has a function of measuring the electric energy supplied from the power system 1.

A power-generation-method-based intensity database (DB) stores environmental loading intensities for each power generation method. FIG. 4 shows an example of the power-generation-method-based intensity DB 2. The power-generation-method-based intensity database may be called an intensity database, simply.

The environmental loading intensity expresses the mass of each environmental load substance such as carbon dioxide, NOx, and SOx emitted when consuming (generating) 1 kWh electric energy (unit electric energy). The environmental loading intensity is defined by using an LCA (life cycle assessment) technique considering the whole life cycle concerning power generation. For example, in thermal power generation, the environmental loading intensities cover all environmental loads generated by constructing a power plant, by fuel for generating power, and by transporting the fuel.

The charge load intensity calculator 10 calculates a charge load intensity based on: the system power information obtained from the power information acquiring unit 9; and the customer power generation information obtained from the power generation information acquiring unit 11; and the power-generation-method-based intensity DB 2.

The charge load intensity, which is used as an index of green level, is a value expressing the environmental load generated per 1 kWh electric energy when charging the storage battery. When this value is large, the storage battery is charged generating large environmental load.

The charge load intensity calculator 10 assumes that the storage unit 16 is charged in the period t+1 (15 minutes in the present embodiment), and calculates the charge load intensity from the power consumption in this period and the amount of environmental load emitted in this period. A calculation example will be shown below.

First, power supplied from the power system 1 is represented as Em(t), the kind of power generation method in the power system 1 is represented as i, and the proportion of power generation based on the method is represented as RMi(t).

Further, power supplied from the power generating facility 3 is represented as Eg(t), the kind of power generation method in the power generating facility is represented as j, and the proportion of power generation based on the method is represented as RGj(t).

Furthermore, electric power consumption rate of the power system 1 with respect to each power generation method is represented as ei(Unit/kWh), and electric power consumption rate of the power generating facility 3 with respect to each power generation method is represented as ej(Unit/kWh), each rate being recorded in the power-generation-method-based intensity DB 2 (see FIG. 4).

Based on the above, environmental load EL(t) when charging the storage unit can be expressed as follows.

$$EL(t)=\Sigma_i E_m(t) \cdot RM_i(t) \cdot e_i(t) + \Sigma_j E_g(t) \cdot RG_j(t) \cdot e_j(t) \quad \text{Formula (1)}$$

Charge load intensity Ec is calculated by the following formula using the environmental load EL(t), the power Em(t) supplied from the power system 1, and the power Eg(t) supplied from the power generating facility 3.

$$Ec(t)=EL(t)/(Em(t)+Eg(t)) \quad \text{Formula (2)}$$

For example, in the case where the system power information and customer power generation information during 15 minutes are as shown in FIG. 2 and FIG. 3, when Formula (1) and Formula (2) are calculated with respect to CO2 emission, the charge load intensity Ec in the period t+1 can be calculated as follows.

$$EL(t+1)=0.075 \cdot 0.3 \cdot 0.975 + 0.075 \cdot 0.2 \cdot 0.742 + 0.075 \cdot 0.3 \cdot 0.022 + 0.075 \cdot 0.2 \cdot 0.053 + 0.050 \cdot 0.06 = 0.0368625 (\text{kgCO2}) \quad \text{Formula (3)}$$

$$Ec(t+1)=0.0368625/(0.075+0.050)=0.2949 \text{ kgCO2/kWh} \quad \text{Formula (4)}$$

In Formula (1), Eg(t)*RGj(t) represents power generation of each power generating unit. When calculating Formula (1), the power generation value of each power generating unit may be directly used instead of using Eg(t) and RGj(t) respectively.

The above charge load intensity is calculated considering power generation of the power system 1 and power generation of the power generating facility 3 at the same time, but power generation of the power system 1 only may be considered. In this case, the charge load intensity can be calculated as follows by setting that Eg(t)=0 in Formula (1) and Formula (2).

$$E_c(t)=EL(t)/E_m(t)=\Sigma_i E_m(t) \cdot RM_i(t) \cdot e_i(t)/E_m(t)=\Sigma_i RM_i(t) \cdot e_i(t)$$

A charge load intensity DB 12 stores therein the charge load intensity calculated by the charge load intensity calculator 10.

A charge/discharge history DB 17 stores the number of charge, the number of discharge, and the number of natural discharge in each time period of one day up to the present. Further, the charge/discharge history DB 17 stores the proportions of the number of charge, the number of discharge, and the number of natural discharge in each time period as charge probability, discharge probability, and natural discharge probability. Here, the natural discharge shows a state where neither charge nor discharge is intended.

FIG. 5 shows an example of the charge/discharge history DB 17. In FIG. 5, the time period is set 15 minutes, but the time interval data may have a shorter value, 1 second, for example. The number of charge and the charge probability correspond to charge frequency. The number of discharge and the discharge probability correspond to discharge frequency. The number of natural discharge and the natural discharge probability correspond to natural discharge frequency.

A charge/discharge controller 15 performs control to charge/discharge the storage unit 16 in accordance with the instruction by a charge/discharge judging unit 14. Further, the charge/discharge controller 15 measures the state of charge (SOC) of the storage unit 16, and notifies the charge/discharge judging unit 14 of the measured value. The SOC is charge level expressed as the proportion of remaining capacity to the total battery capacity. Further, the charge/discharge controller 15 updates the charge/discharge history DB 17 based on charge, discharge, or natural discharge performed in each time period in the charge/discharge history DB 17.

The charge/discharge judging unit 14 judges whether the storage unit 16 should be charged, discharged, or naturally discharged in the period t+1 based on the charge load intensity calculated by the charge load intensity calculator 10, charge/discharge history of the charge/discharge history DB 17, and the SOC of the storage unit 16 in the period t.

The charge/discharge judging unit 14 notifies the charge/discharge controller 15 of a judgment result showing that charge, discharge, or natural discharge should be performed in the period t+1. The charge/discharge controller 15 performs control to charge/discharge the storage unit 16 depending on the notified judgment result.

An interface unit 13 accesses the charge/discharge history DB 17 and the charge load intensity DB 12 to read the data stored therein, and outputs the data to a display or another system (not shown).

Figure 6:
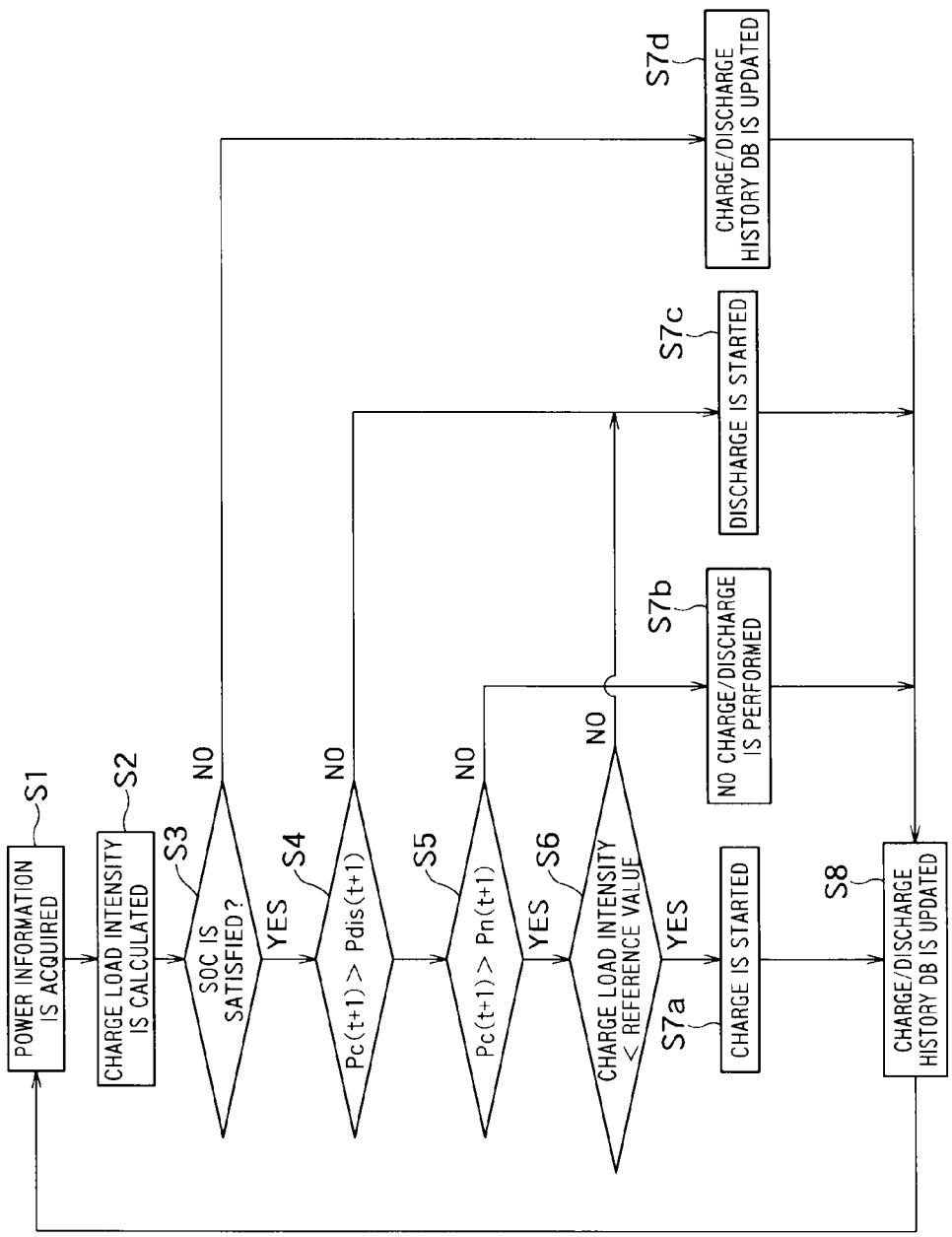
FIG. 6 is a flow chart showing the flow of operation performed by the system of FIG. 1.

FIG. 6 is a flow chart showing the flow of operation performed by the system 100 of FIG. 1, particularly showing the charge/discharge judging operation of the charge/discharge judging unit 14.

At step S1, the charge load intensity calculator 10 acquires, in the period t, the system power information and customer power generation information concerning the period t+1 from the power information acquiring unit 9 and the power generation information acquiring unit 11.

At step S2, the charge load intensity calculator 10 calculates the charge load intensity Ec based on the system power information and customer power generation information obtained in step S1 and the power-generation-method-based intensity DB 2. As stated above, the charge load intensity is a value expressing the environmental load generated per 1 kWh electric energy when charging the storage battery.

At step S3, the charge/discharge controller 15 measures the SOC of the storage unit 16, and notifies the charge/discharge judging unit 14 of the measured SOC.

The charge/discharge judging unit 14 checks whether the SOC satisfies battery capacity conditions for reducing deterioration. In this example, a lithium-ion battery is used as the storage battery, and the deterioration reducing condition is to charge/discharge the storage unit 16 to keep its SOC between 20% and 80%. 20% corresponds to a first threshold value, and 80% corresponds to a second threshold value.

Note that various variables may be selected for the condition value of this deterioration reducing condition, depending on the kind and state of the battery. For example, it is possible to use a condition combined with temperature and SOH (State of Health) representing the deterioration level of the battery.

When the SOC is less than 20%, charge is preferentially performed (step S7*d*). In this case, higher priority is given on the lifetime of the storage battery than the environmental load generated by performing charge. When the SOC is greater than 80%, determination is made to perform discharge preferentially (step S7*d*). The charge/discharge judging unit 14 notifies the charge/discharge controller 15 of the determination. The charge/discharge controller 15 receives the notification and charges or discharges the storage unit 16 in the period t+1.

Note that when the SOC reaches 80% while charging the storage unit, charge may be stopped at that point. Further, when the storage battery to be discharged is not connected to a device which can serve as a load, no discharge is performed.

In the judgment at step S3, when the SOC is 20% or greater and 80% or less, the flow proceeds to step S4.

At step S4, whether discharge should be performed is judged by using charge probability Pc(t+1) and discharge probability Pdis(t+1) in the period t+1 stored in the charge/discharge history DB 17 (see FIG. 5). The charge probability Pc(t+1) corresponds to corresponds to a first charge frequency, and a discharge probability Pdis(t+1) corresponds to a first discharge frequency.

When the discharge probability Pdis(t+1) is equal to or greater than the charge probability Pc(t+1), that is, when Pc(t+1)≤Pdis(t+1), the previous history shows that discharge will be performed in the next period (t+1) with high probability, and thus determination is made to discharge the storage unit 16 (step S7*c*).

The charge/discharge judging unit 14 instructs the charge/discharge controller 15 to discharge the storage unit in the period t+1. The charge/discharge controller 15 receives the instruction and discharges the storage unit 16 in the period t+1. Note that when the storage battery to be discharged is not connected to a device which can serve as a load, no discharge is performed.

In the judgment at step S4, when the discharge probability Pdis(t+1) is smaller than the charge probability Pc(t+1), that is, when Pc(t+1)>Pdis(t+1), the flow proceeds to step S5.

At step S5, whether charge should be performed is judged by using the charge probability Pc(t+1) and natural discharge probability Pn(t+1) in the period t+1 stored in the charge/discharge history DB 17. The natural discharge probability Pn(t+1) corresponds to a first natural discharge frequency.

When the natural discharge probability Pn(t+1) is equal to or greater than the charge probability Pc(t+1), that is, when Pc(t+1)≤Pn(t+1), the previous history shows that natural discharge will be performed in the next period t+1 with high probability, and thus determination is made to naturally discharge (not to charge and discharge) the storage unit (step S7*b*). The charge/discharge judging unit 14 instructs the charge/discharge controller 15 to naturally discharge the storage unit in the period t+1. The charge/discharge controller 15 receives the instruction and naturally discharges the storage unit 16 in the period t+1.

When the natural discharge probability Pn(t+1) is smaller than the charge probability Pc(t+1), that is, when Pc(t+1)>Pn(t+1), the flow proceeds to step S6.

At step S6, whether the charge load intensity is smaller than a reference value is judged. In other words, whether the environmental load generated by electric power consumed when charging the storage unit in the period t+1 is large or small is judged.

The reference value for the judgment is determined by a user. For example, it is possible to use an intensity of 0.418 kg $CO_2$/kWh, which is set by Federation of Electric Power Companies of Japan and generally used in Japan. In this example, this value is used.

When the charge load intensity is smaller than the reference value, charge can be performed at a higher green level consuming less electric power than the average electric power in Japan. For example, the charge load intensity (=0.2949) calculated in the above Formula (4) is smaller than the reference value. This shows that charge is performed in the period t+1 reducing the environmental load. Therefore, the charge/discharge judging unit 14 determines to charge the storage unit in the period t+1, and instructs the charge/discharge controller 15 to do so (step S7*a*). The charge/discharge controller 15 receives the instruction and charges the storage unit 16 in the period t+1. Note that when the SOC reaches 80% while charging the storage unit, charge may be stopped at that point.

To the contrary, when the charge load intensity is equal to or greater than the reference value, charge in the period t+1 generates large environmental load, and thus determination is made to discharge the storage unit (step S7*c*). The charge/discharge judging unit 14 instructs the charge/discharge controller 15 to discharge the storage unit in the period t+1. The charge/discharge controller 15 receives the instruction and discharges the storage unit 16 in the period t+1. Note that when the storage battery to be discharged is not connected to a device which can serve as a load, no discharge is performed. At step S7*c*, natural discharge may be performed instead of performing discharge.

At step S8, the charge/discharge controller 15 updates the charge/discharge history DB 17 in synchronization with the start of charge, discharge, or natural discharge in step S7a, S7b, S7c, or S7d. That is, the number of charge, the number of discharge, or the number of natural discharge corresponding to the period t+1 is incremented, and the charge probability, discharge probability, and natural discharge probability are calculated and updated. After that, the flow returns back to step S1. At step S1, t is incremented by 1 (that is, t+2), and a process similar to the above is subsequently repeated.

At steps S4, S5, and S6, comparison is made using the charge probability, discharge probability, and natural discharge probability, but the comparison may be made using the number of charge, the number of discharge, and the number of natural discharge.

Figure 7:
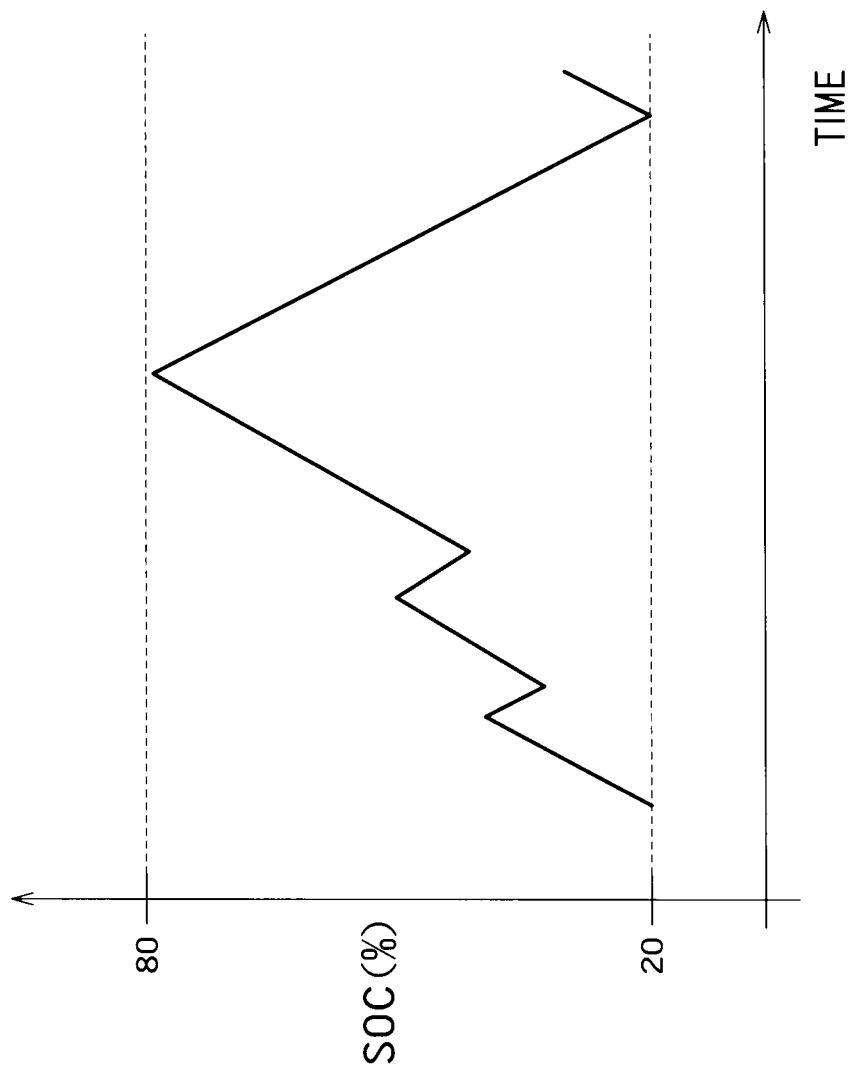
FIG. 7 is a diagram showing an example of charge/discharge control.

By performing the above steps, the storage unit 16 is charged/discharged based on a schedule for keeping the SOC between 20% and 80% as shown in FIG. 7. Therefore, deterioration of the storage battery can be greatly reduced, which increases the life of the storage battery.

Further, since whether charge should be performed is determined based on the charge load intensity, charge/discharge can be performed considering the reduction in the environmental load.

Further, since charge/discharge is scheduled referring to the previous charge/discharge history, the possibility of troubling the customer by the lack of electric power can be reduced as much as possible.

(Second Embodiment)

Figure 8:
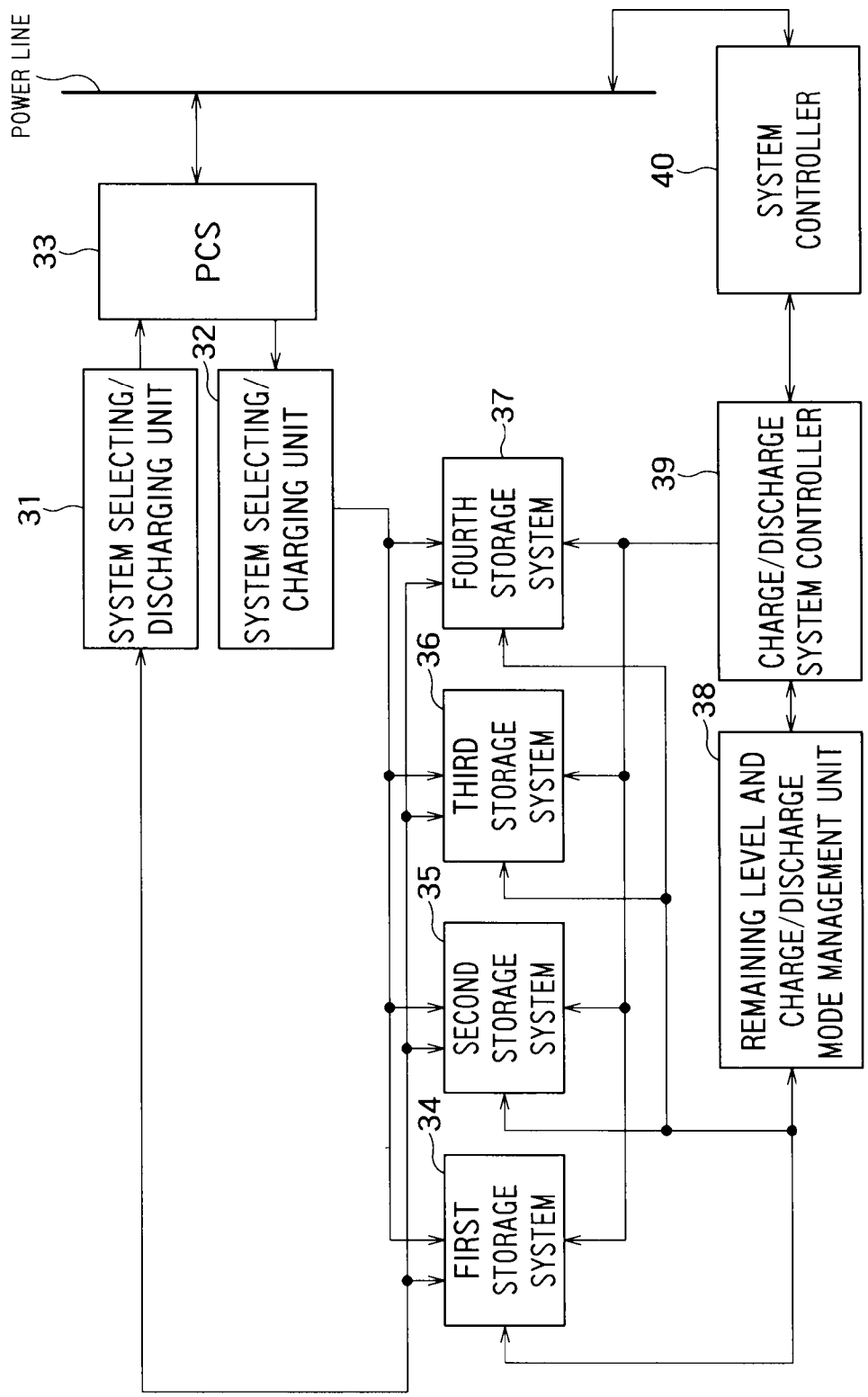
FIG. 8 is a diagram showing the structure of a storage battery management system according to a second embodiment.

FIG. 8 shows an example of a storage battery management system according to a second embodiment. The system of the present embodiment has a plurality of storage battery systems, and charge/discharge of each storage battery system is appropriately controlled to reduce the deterioration of the storage battery. The storage battery system is formed of one storage battery or a pair of storage batteries. In the present embodiment, the storage battery is a lithium-ion battery.

The system of the present embodiment includes: a plurality of storage systems (a first storage system 34, a second storage system 35, a third storage system 36, and a fourth storage system 37); a remaining level and charge/discharge mode management unit 38; a charge/discharge system controller 39; a system controller 40; a system selecting/discharging unit 31; a system selecting/charging unit 32; and a PCS (power conditioner) 33.

The remaining level and charge/discharge mode management unit 38 controls the remaining level of each storage system. Further, the remaining level and charge/discharge mode management unit 38 sets and controls the mode of each storage system. Each storage system is set to either a discharge mode or a charge mode.

The charge/discharge system controller 39 determines the storage system to be discharged or charged based on a charge/discharge request from the outside and the remaining level and mode of each storage system, and instructs the system selecting/discharging unit 31 or the system selecting/charging unit 32 to discharge or charge the determined storage system.

Each of the system selecting/discharging unit 31 and the system selecting/charging unit 32 discharges or charges the specified storage system.

The system controller 40 performs control to charge the storage system by the power from the power system.

Hereinafter, the charge/discharge management operation performed by the system of the present embodiment will be explained using a plurality of case examples.

[First Case]

Figure 9:
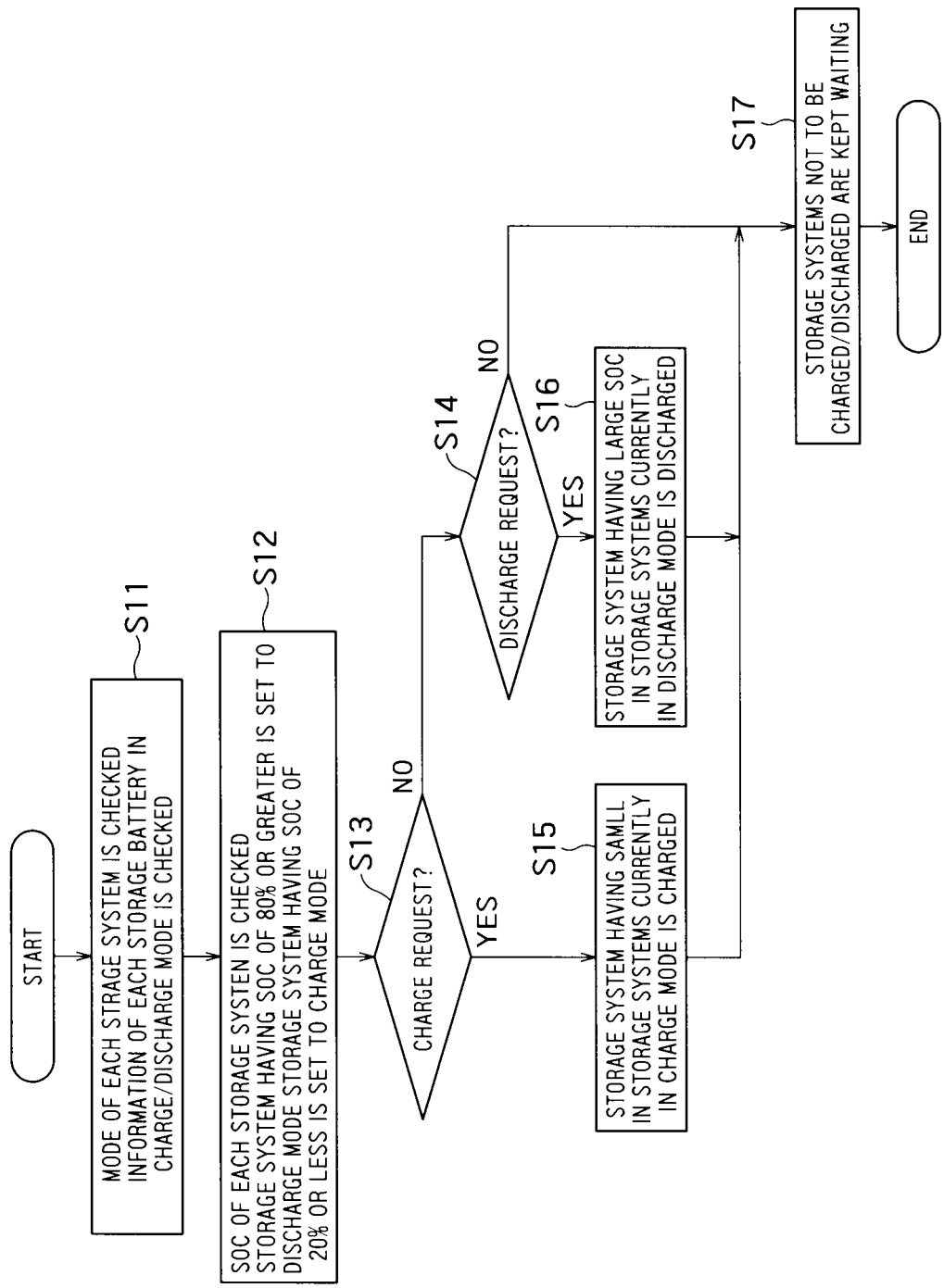
FIG. 9 is a flow chart showing the flow of a charge/discharge determination process according to a first case.

FIG. 9 is a flow chart showing the flow of a charge/discharge determination process according to a first case.

Figure 11:
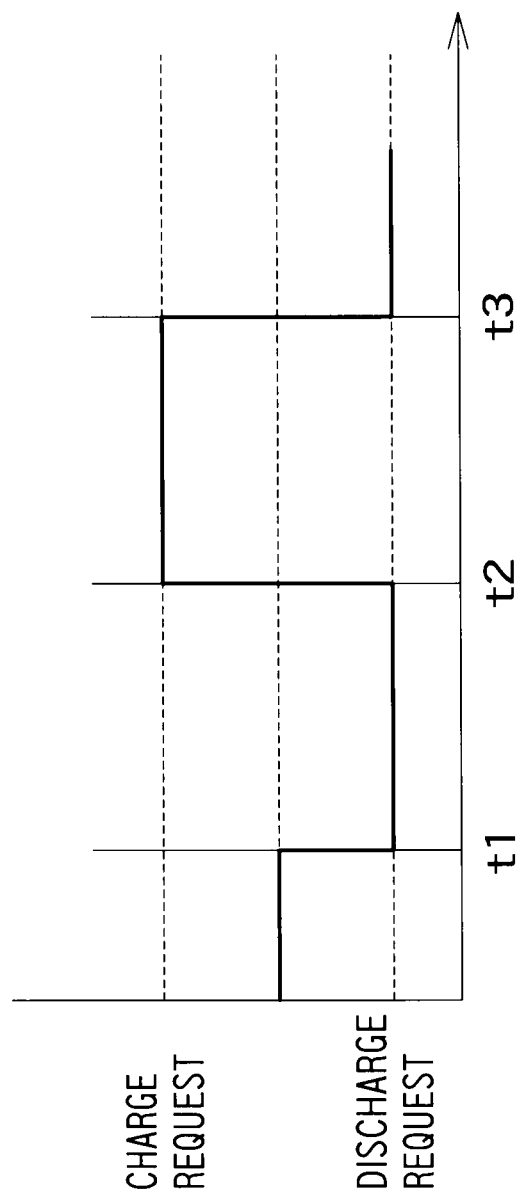
FIG. 11 is a diagram showing an example of a charge/discharge request.

This process flow is carried out depending on the charge/discharge request transmitted from the outside at regular intervals. This case is based on an assumption that the charge/discharge request shown in FIG. 11 is transmitted to this system. A waiting request for requesting neither discharge not charge is transmitted before time t1, discharge request is transmitted at time t1, charge request is transmitted at time t2, and discharge request is transmitted at time t3. The charge/discharge request is transmitted to the charge/discharge system controller 39 through the system controller 40.

Figure 10:
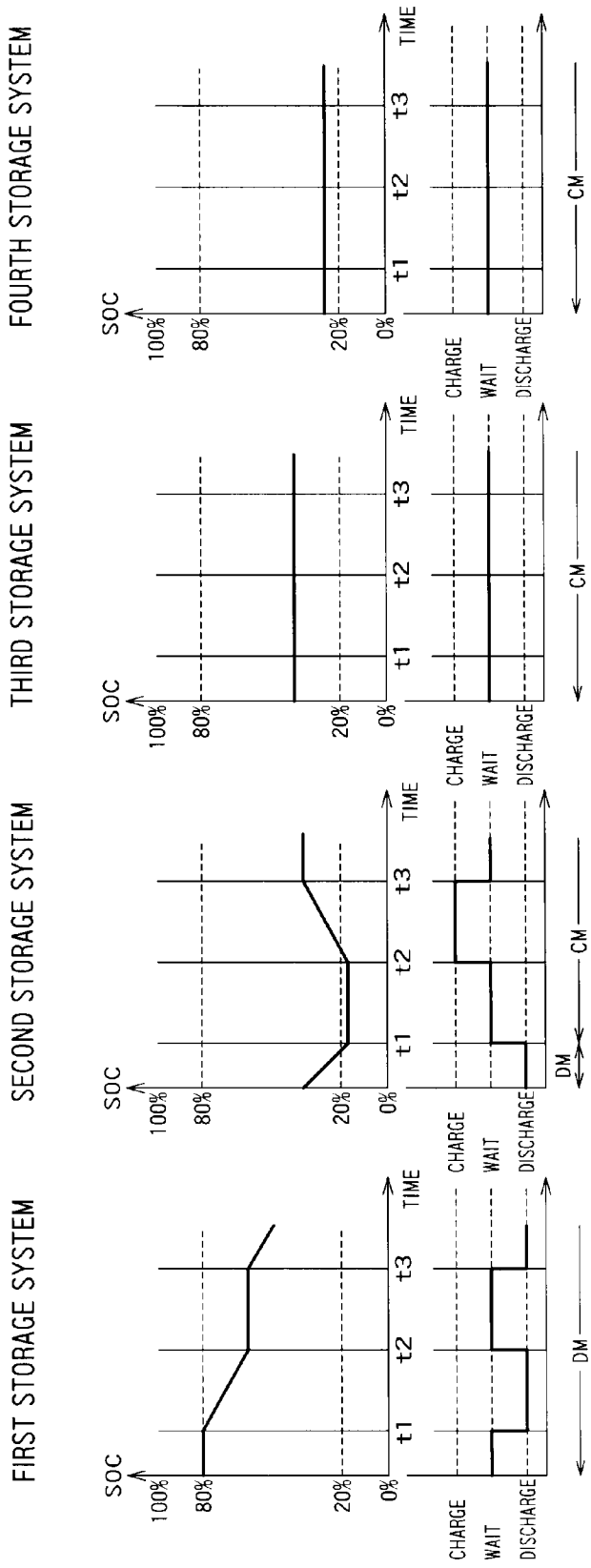
FIG. 10 is a diagram showing the mode and SOC of each storage system according to the first case.

First, at step S11, the remaining level and charge/discharge mode management unit 38 checks the mode of each storage system. FIG. 10 shows the mode and SOC of each storage system in this case. CM represents charge mode, and DM represents discharge mode. Before the start of step S11 (before time t1), the first storage system 34 and the second storage system 35 are in the discharge mode, and the third storage system 36 and the fourth storage system 37 are in the charge mode. At present (time t1), the first storage system 34 and the second storage system 35 are in the discharge mode, and the third storage system 36 and the fourth storage system 37 are in the charge mode.

Next, at step S12, the SOC of each storage system is checked, and the mode of each storage system is determined and set. In the case of a general lithium-ion battery, it is necessary to keep the SOC within the range between 20% and 80% in order to reduce deterioration. The storage system having an SOC of 80% or greater is set to the discharge mode, the storage system having an SOC of 20% or less is set to the charge mode, and the storage system having an SOC which is greater than 20% and smaller than 80% remains in the present mode. In this example, the second storage system 35 is newly set to the charge mode (SOC is less than 20%), and each of the first storage system 34, the third storage system 36, and the fourth storage system 37 remains in the previous mode. The storage system once set to the charge mode remains in the charge mode until the SOC reaches 80%, and the storage system once set to the discharge mode remains in the discharge mode until the SOC becomes 20% or less.

Next, at steps S13 and S14, the charge/discharge system controller 39 checks the charge/discharge request transmitted to the system.

When the charge/discharge request is the charge request, the flow proceeds to step S15. At step S15, the charge/discharge system controller 39 selects a system having the smallest SOC in the storage systems in the charge mode, and instructs the system selecting/charging unit 32 to charge the selected storage system. The system selecting/charging unit 32 receives the instruction, and charges the selected storage system through the PCS 33 connected to the power line. The electric power for charge is supplied from the power system (see FIG. 1), and the system controller 40 controls the charge from the power system. When another storage system was previously charged (in the period before time t1), the another storage system is stopped being charged.

On the other hand, when the charge/discharge request is the discharge request, the flow proceeds to step S16. At step S16, the charge/discharge system controller 39 selects a system having the largest SOC in the storage systems in the discharge mode, and instructs the system selecting/discharging unit 31 to discharge the selected storage system. The system selecting/discharging unit 31 receives the instruction, and discharges the selected storage system through the PCS 33 connected to the power line. When another storage system was previously discharged (before time t1), the system selecting/discharging unit 31 stops discharging the another storage system.

The storage systems which are not selected as charge/discharge targets in steps S15 and S16 are kept waiting (S17). When the charge/discharge request is the waiting request, all storage systems are kept waiting (S17).

In this example, since a discharge request is transmitted at time t1 as shown in FIG. 11, the first storage system 34 having the largest SOC is discharged first as shown in FIG. 10. Here, only the first storage system 34 is in the discharge mode. Further, since a charge request is transmitted at time t2 as shown in FIG. 11, the second storage system 35 having the smallest SOC in the storage systems in the discharge mode is charged as shown in FIG. 10.

[Second Case]

In the first case, one storage system is charged or discharged. In this case, a plurality of storage systems are charged or discharged at the same time.

Figure 12:
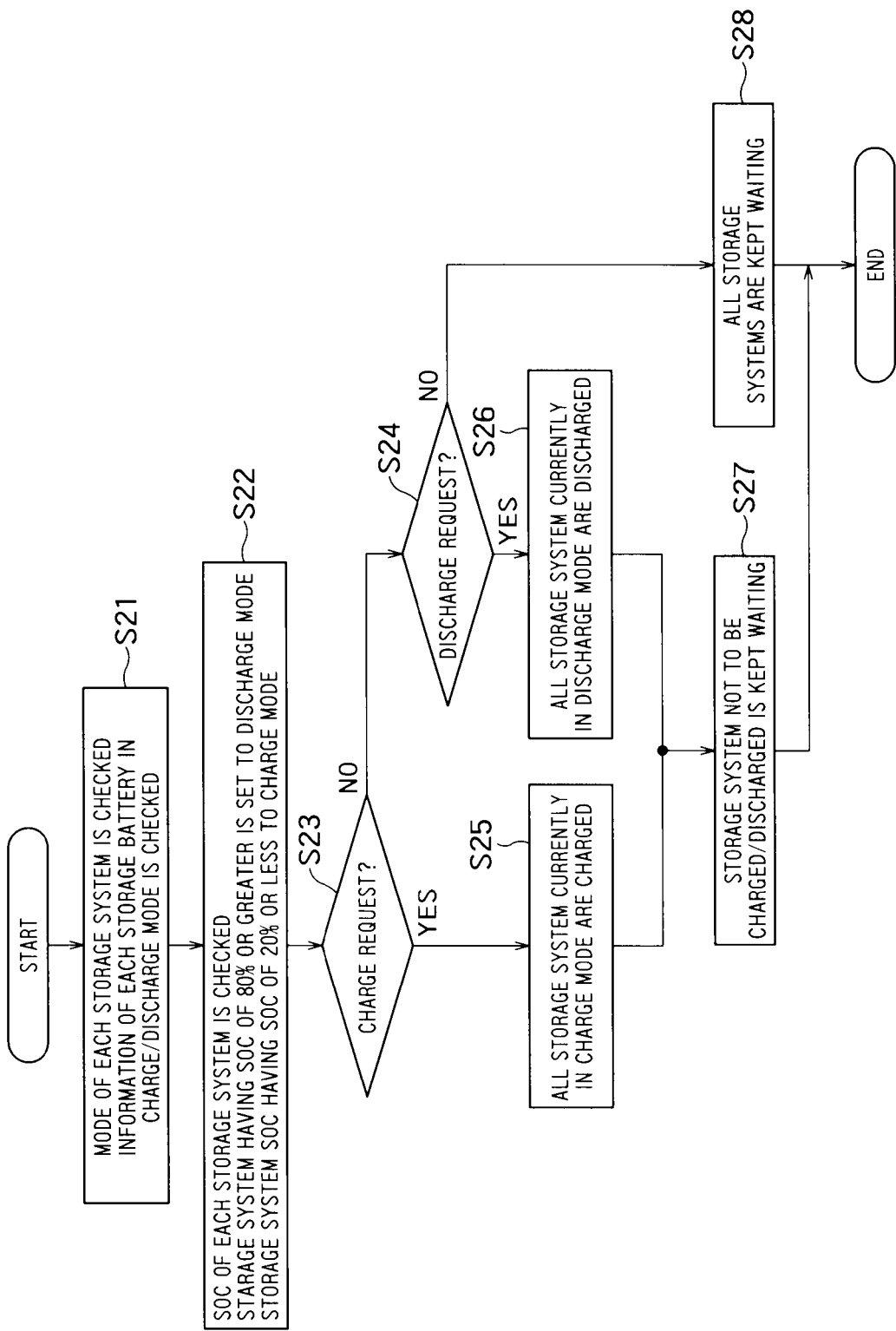
FIG. 12 is a flow chart showing the flow of a charge/discharge determination process according to a second case.
Figure 13:
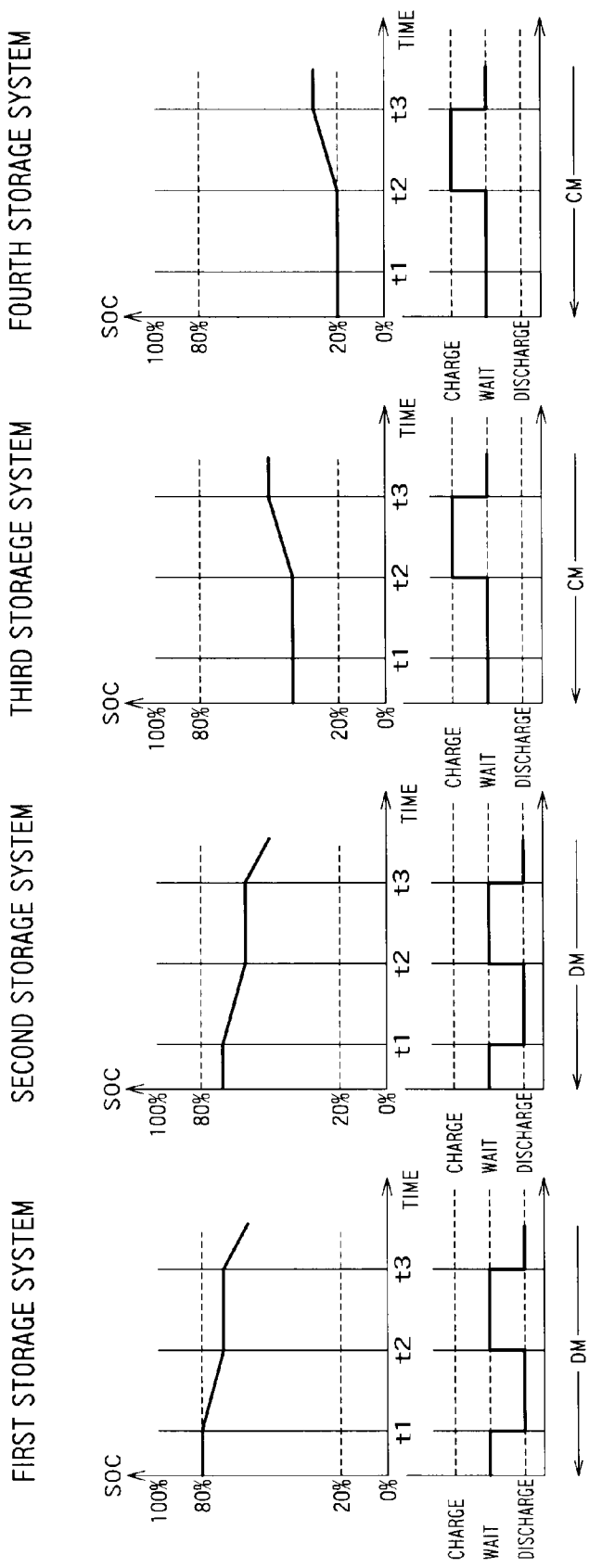
FIG. 13 is a diagram showing the mode and SOC of each storage system according to the second case.

FIG. 12 is a flow chart showing the flow of a charge/discharge determination process according to the second case. FIG. 13 shows the mode and SOC of each storage system in this case. Similarly to the first case, this case is based on an assumption that the charge/discharge request shown in FIG. 11 is transmitted to this system.

Since steps S21, S22, S23, and S24 in FIG. 12 are similar to steps S11, S12, S13, and S14 in FIG. 9, explanation thereof will be omitted.

When the charge/discharge request is the discharge request, all storage systems in the discharge mode are discharged by dividing discharge amount among the storage systems (S26). In the example of FIG. 13, the first storage system 34 and the second storage system 35 are simultaneously discharged in the period from time t1 to t2.

When the charge/discharge request is the charge request, all storage systems in the charge mode are charged by dividing charge amount among the storage systems (S25). In the example of FIG. 13, the third storage system 36 and the fourth storage system 37 are simultaneously charged in the period from time t2 to t3.

The storage systems which are not selected as charge/discharge targets are kept waiting (S27). When the charge/discharge request is the waiting request, all storage systems are kept waiting (S28).

[Third Case]

As an example derived from the first case, the operation when the discharge request is transmitted with all storage systems being in the charge mode will be explained.

In this case, the storage systems are sequentially discharged in descending order of SOC. The flow of operation in this case is basically similar to FIG. 9, except in that step S16 should be changed to sequentially discharge the storage systems in the charge mode in descending order of SOC.

Figure 14:
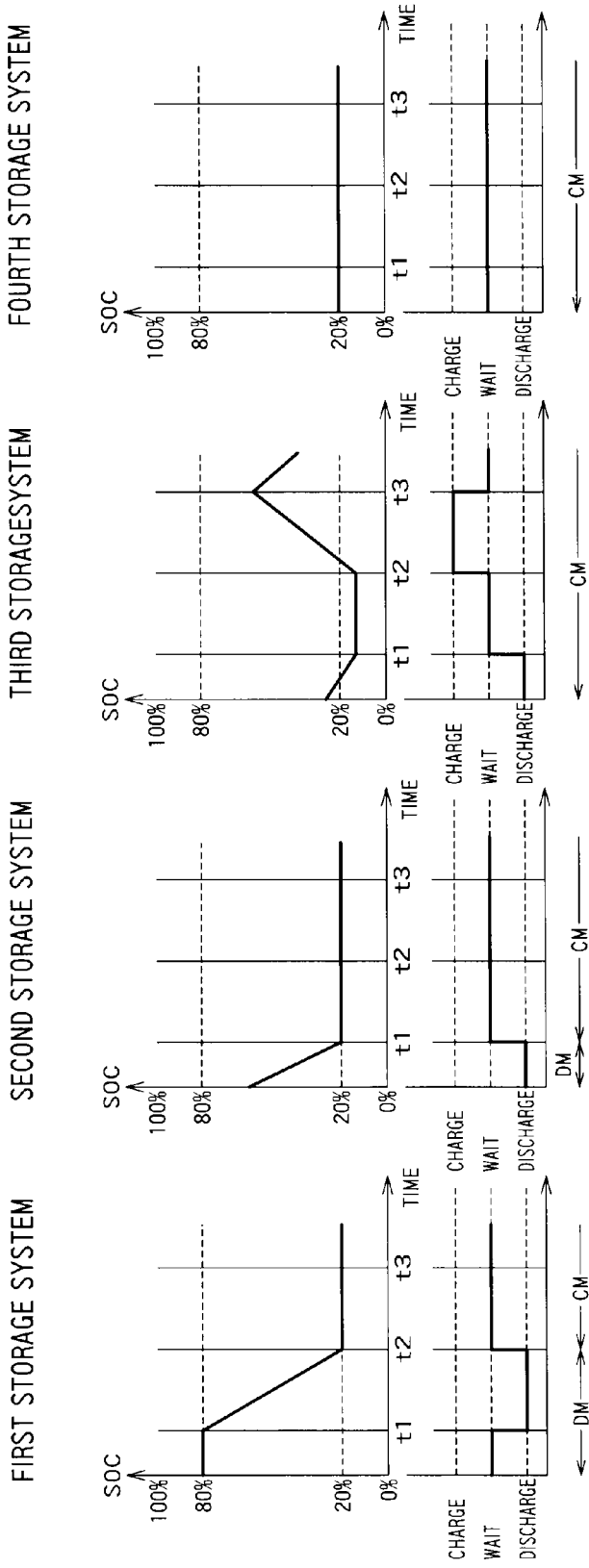
FIG. 14 is a diagram showing the mode and SOC of each storage system according to a third case.

FIG. 14 shows the mode and SOC of each storage system in this case.

At time t2, all storage systems enter the charge mode. When the discharge request is transmitted at time t3, the third storage system 36 having the largest SOC in all storage systems is discharged first.

By operating the storage battery system as in the first to third cases, the operating lifetime of the storage battery system can be lengthened, and the storage battery systems dispersedly arranged can be effectively charged or discharged at any time.

Each of the above cases is explained based on the assumption that charge speed and discharge speed are the same. When each storage system has a different kind of storage battery having different charge/discharge speed, storage battery management as in the present embodiment can be achieved by setting the time interval for determining the charge/discharge mode as short as possible.

(Third Embodiment)

Figure 15:
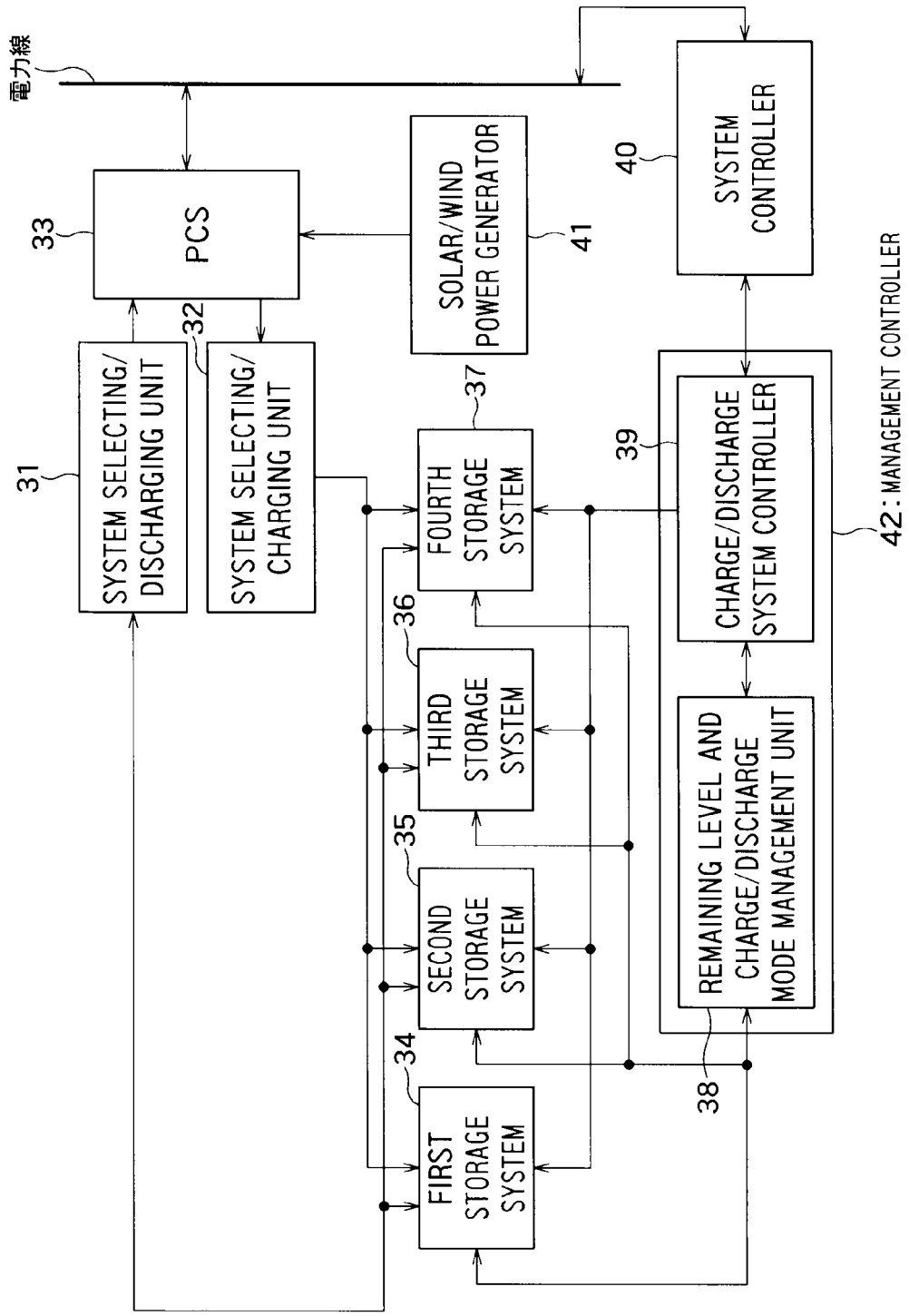
FIG. 15 is a diagram showing a structural example of a storage battery management system according to a third embodiment.

In the second embodiment, any one of charge and discharge is selectively performed. In the example shown in the present embodiment, charge and discharge are carried out at the same time. It is required to simultaneously perform the charge process and discharge process when the system has a power generator 41 for generating electric power by using natural energy such as solar power and wind power as in the structure of FIG. 15. In FIG. 15, the functions of the remaining level and charge/discharge mode management unit 38 and the charge/discharge system controller 39 are integrated into a management controller 42.

Figure 16:
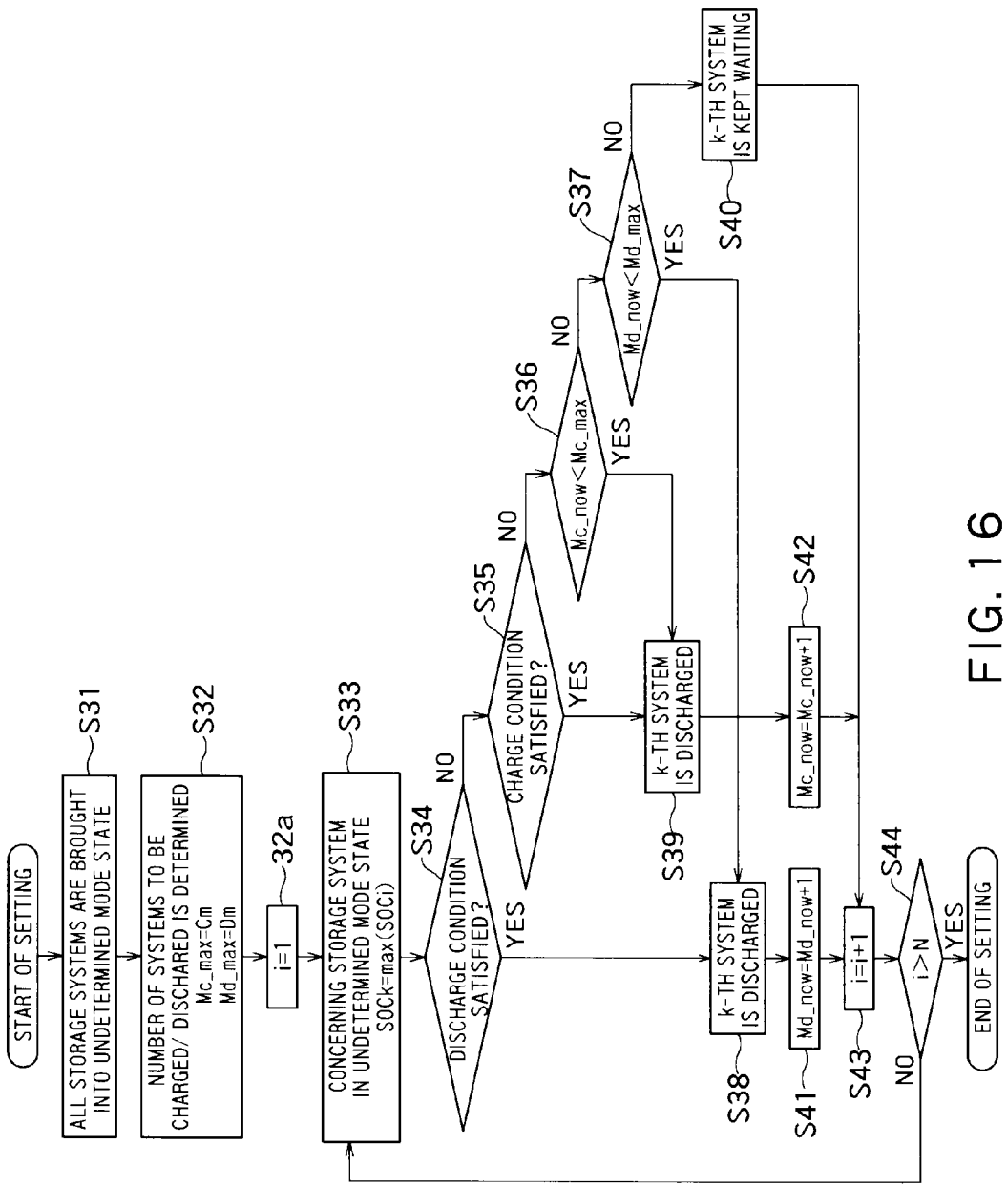
FIG. 16 is a flow chart showing the flow of a charge/discharge determination process according to the third embodiment.
Figure 17:
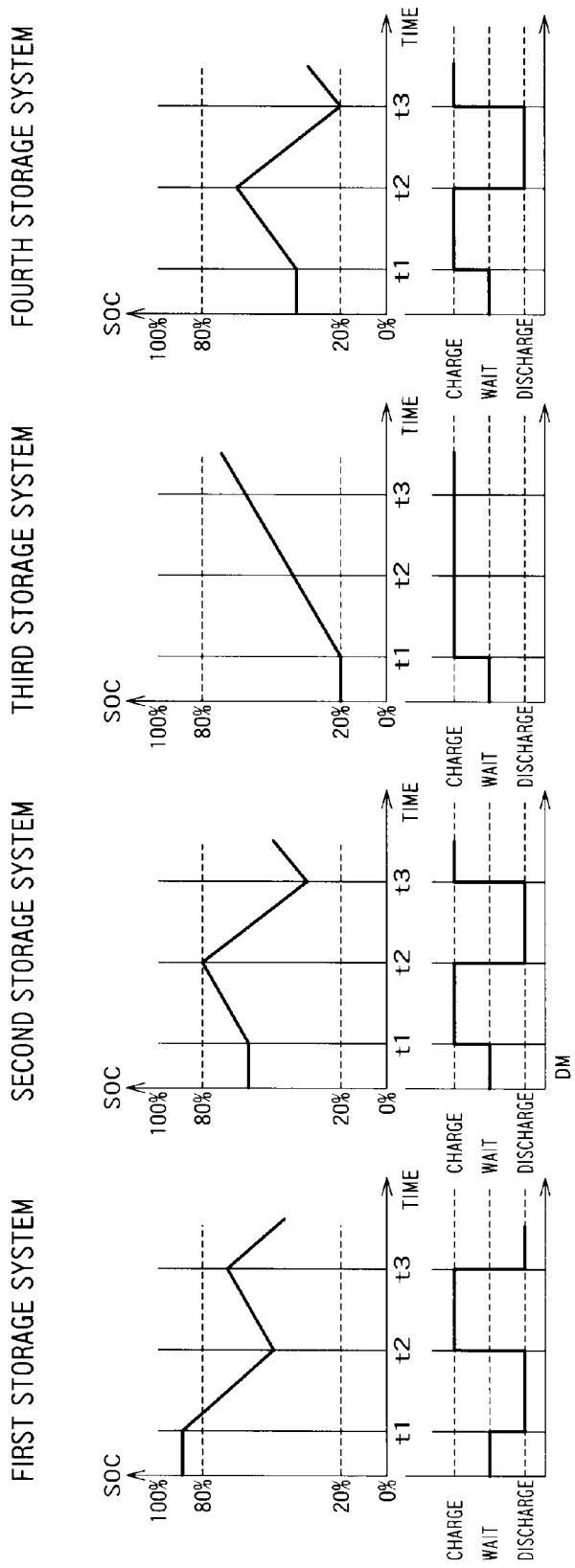
FIG. 17 is a diagram showing the mode and SOC of each storage system.

FIG. 16 is a flow chart showing the flow of a charge/discharge determination process according to the present embodiment. In the flow of operation in FIG. 16, each of a plurality of storage systems is set to be charged, discharged, or kept waiting at regular intervals. FIG. 17 shows the mode and SOC of each storage system in the present embodiment. The operation flow of FIG. 16 will be explained referring to FIG. 17 as needed.

At step S31, first, all storage systems are brought into a state of undetermined mode.

At step S32, Cm showing the maximum number of storage systems expected to be in the charge mode is set for a parameter Mc_max, and Dm showing the maximum number of storage systems expected to be in the discharge mode is set for a parameter Md_max.

Figure 18:
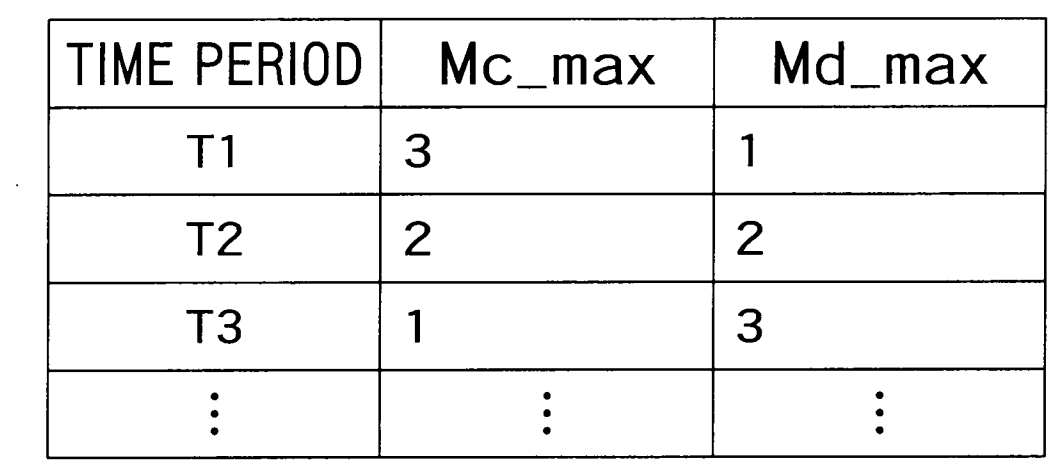

Concretely, the values of Mc_max and Md_max are set in accordance with the table of FIG. 18. In this table, Mc_max and Md_max are set in each time period of one day in accordance with the power demand by the customer. For example, during the midnight where discharge is hardly performed, the number of storage systems in the discharge mode is reduced. The values of the 1st row are applied to a time period T1, the values of the 2nd row are applied to a second time period T2, and the values of the 3rd row are applied to a time period T3. The time period covering the present time is specified, and the values corresponding to the specified time period are read as Cm and Dm to be set for Mc_max and Md_max. In this example, time t1 belongs to the time period T1, time t2 belongs to the time period T2, and time t3 belongs to the time period T3. In the case of time t1, Mc_max is 3, and Md_max is 1.

At step S32a, 1 is set for a parameter i (i=1). Further, the values of the parameters Mc_now, Md_now, and Mn_now are initialized to be 0.

i stores the number of storage systems judged after the start of this flow. Mc_now stores the total number of storage systems set to the charge mode after the start. Md_now stores the total number of storage systems set to the discharge mode after the start. Mn_now stores the total number of storage systems set to the wait mode after the start.

At step S33, a storage system having the maximum SOC in the storage systems in the undetermined mode state is selected (SOCk=max(SOCi)). The subscript k of SOCk shows the system number of the storage system having the maximum SOC in the storage systems in the undetermined mode state.

As shown in FIG. 17, at time t1, SOC1=90%, SOC2=60%, SOC3=20%, and SOC4=40%. Thus, the first storage system 34 is selected. That is, SOCk=SOC1. Note that the SOC value of each storage system is managed by the remaining level and charge/discharge mode management unit 38.

After that, at step S34, whether SOCk(SOC1) satisfies a priority discharge condition is checked. In the present embodiment, the priority discharge condition is set as SOC>80%. The priority discharge condition is set differently depending on the characteristics of the storage system and the usage of the system. At time t1, SOC1>80%, which shows that SOC1 of the first storage system 34 satisfies the priority discharge condition, and thus the first storage system 34 is discharged from time t1 (S38). 1 is added to the parameter Md_now+1 (Md_now=Md_now+1) (S41). Further, i is incremented (i=i+1), and if the value of i is N or less, the flow returns back to step S33. If the value of i is greater than N, the main process is ended. N is the total number of storage systems (4 in this example). In this example, Md_now is updated to 1 (S41), i is updated to 2 (S43), the flow returns back to step S33, and the second storage system 35 having the second largest SOC is selected.

At step S35, a priority charge condition is checked. In the present embodiment, the priority charge condition is set as SOC>20%. Since SOC2 of the second storage system 35 secondarily selected exceeds 20%, neither the priority discharge condition (S34) nor the priority charge condition (S35) is satisfied. Therefore, the flow proceeds to step S36.

At steps S36 and S37, determination is made on whether or not to charge/discharge the storage system which does not satisfy the priority charge condition and priority discharge condition.

First, when the number of storage systems set to the charge mode up to the present (Mc_now) does not reach the maximum value Mc_max, the storage system is set to the charge mode to be charged (S36 and S39). After that, 1 is added the parameter Mc_now+1 (Mc_now=Mc_now+1) (S42). Further, i is incremented (i=i+1) (S43), and if the value of i is N or less (NO at S44), the flow returns back to step S33.

On the other hand, when the number of storage systems (Mc_now) reaches the maximum value Mc_max, whether the number of storage systems set to the discharge mode up to the present (Md_now) reaches the maximum value Md_max is checked and if not, the storage system is set to the discharge mode to be discharged (S37 and S38). After that, 1 is added to the parameter Md_now+1 (S41). Further, i is incremented (S43), and if the value of i is N or less (NO at S44), the flow returns back to step S33.

When the number of storage systems (Md_now) reaches the maximum value Md_max, the target storage system is set to the wait mode (S40). After that, i is incremented (i=i+1) (S43), and if the value of i is N or less (NO at S44), the flow returns back to step S33.

In this example, when secondarily selecting the second storage system 35, the condition that Mc_now(=0)<Mc_max (=3) is satisfied at step S36, and thus the second storage system 35 is set to the charge mode to be charged (S39). After that, Mc_now is updated to 1 (S42), i is updated to 3 (S43), the flow returns back to step S33, and the fourth storage system 37 having the next largest SOC is selected.

Since the SOC of the fourth storage system 37 is 40%, neither the priority discharge condition (S34) nor the priority charge condition (S35) is satisfied, and the flow proceeds to step S36. Since the condition that Mc_now(=1)<Mc_max (=3) is satisfied, the second storage system 35 is set to the charge mode to be charged (S39). After that, Mc_now is updated to 2 (S42), i is updated to 4 (S43), the flow returns back to step S33, and the third storage system 36 having the next largest SOC is selected.

Since the SOC of the third storage system 36 is 20%, neither the priority discharge condition (S34) nor the priority charge condition (S35) is satisfied, and the flow proceeds to step S36. Since the condition that Mc_now(=2)<Mc_max (=3) is satisfied, the third storage system 36 is set to the charge mode (S39). After that, Mc_now is updated to 3 (S42), i is updated to 5 (S43), and when i>N(=4) (YES at S44), the flow is ended.

The discharge process at step S38 and the charge process at step S39 may be simultaneously carried out after the mode of every storage system is determined, or may be carried out each time the mode is determined.

When SOCk of the k-th storage system satisfies the priority discharge condition at step S34, the k-th storage system is discharged at step S38 even if the value of Md_now reaches Md_max. Similarly, when SOCk of the k-th storage system satisfies the priority charge condition at step S35, the k-th storage system is charged at step S39 even if the value of Mc_now reaches Mc_max.

As stated above, according to the present embodiment, the operating lifetime of the storage battery system can be lengthened, and the storage battery systems dispersedly arranged can be effectively charged or discharged at any time. In the present embodiment, the number of storage systems is set 4 similarly to the second embodiment, but the above systems can be employed when the number of storage systems is 2 or greater.

The invention claimed is:

1. A storage battery management system, comprising:
   a power receiving unit configured to receive power generated by a plurality of power generating units via a power system;
   a power information acquiring unit configured to acquire first system power information showing a proportion of power generated by each power generating unit in a first period;
   an intensity database configured to store environmental loading intensities indicating each an amount of environmental load emitted by each power generating unit per unit electric energy;
   a charge load intensity calculator configured to calculate a charge load intensity which is a weighted sum of the environmental loading intensities corresponding to each power generating unit by the proportion of each power generating unit shown in the first system power information;
   a storage unit configured to be capable of charging/discharging power;
   a charge/discharge judging unit configured to determine to charge the storage unit in the first period when the charge load intensity is less than a reference value, and to determine not to charge the storage unit in the first period when the charge load intensity is equal to or greater than the reference value; and
   a charge/discharge controller configured to charge the storage unit in the first period by using the power received by the power receiving unit, when the charge/discharge judging unit determines to charge the storage unit.

2. The system of claim 1, wherein the charge/discharge judging unit unconditionally determines to charge the storage unit in the first period when a charge level showing a proportion of remaining capacity to a total capacity of the storage unit is less than a first threshold value.

3. The system of claim 2,
   wherein the charge/discharge judging unit determines to discharge the storage unit in the first period when the charge level is larger than a second threshold value which is larger than the first threshold value, and
   the charge/discharge controller discharges the storage unit.

4. The system of claim 3 further comprising:
   a charge/discharge history database configured to store a charge frequency, a discharge frequency, and a natural discharge frequency, each showing proportion or number of times of the charge, discharge, and natural discharge carried out in each of a plurality of time periods, wherein the charge/discharge judging unit performs:

acquiring, from the charge/discharge history database, a first charge frequency, a first discharge frequency, and a first natural discharge frequency corresponding to a time period of the first period;

determining to discharge the storage unit in the first period when the first discharge frequency is equal to or greater than the first charge frequency;

determining to naturally discharge the storage unit in the first period when the first discharge frequency is less than the first charge frequency and the first natural discharge frequency is equal to or greater than the first charge frequency;

determining to charge the storage unit in the first period when the first discharge frequency is less than the first charge frequency, the first natural discharge frequency is less than the first charge frequency, and the charge load intensity is less than the reference value; and determining to discharge or naturally discharge the storage unit in the first period when the first discharge frequency is less than the first charge frequency, the first natural discharge frequency is less than the first charge frequency, and the charge load intensity is equal to or greater than the reference value, and the charge/discharge controller charges, discharges or naturally discharges the storage unit based on determination by the charge/discharge judging unit, and updates data corresponding to the time period of the first period stored in the charge/discharge history database.

5. The system of claim 1, further comprising:

one or more second power generating units configured to generate power;

a generated energy measuring unit configured to measure electric energy generated by each of the second power generating units;

a storage configured to store data of the generated electric energy measured by the generated energy measuring unit; and a predicting unit configured to predict power generation produced by the second power generating unit in the first period with respect to each power generating unit, based on the generated electric energy previously stored in the storage, wherein the power information acquiring unit acquires second system power information showing an available electric energy supply from the power system in the first period, the intensity database stores environmental loading intensities of each second power generating unit, and the charge load intensity calculator calculates the charge load intensity by adding values obtained by multiplying the predicted power generation of each second power generating unit by the environmental loading intensities of each second power generating unit to a value obtained by multiplying the weighted sum by the value of electric energy shown in the second system power information, and then by dividing added value by a total of the value of the electric energy and the value of the predicted power generation of each second power generating unit.

* * * * *